(12) United States Patent
Choi et al.

(10) Patent No.: US 11,697,334 B2
(45) Date of Patent: Jul. 11, 2023

(54) VEHICLE DOOR GLASS ASSEMBLY AND METHOD FOR REGULATING POSITION OF DOOR GLASS

(71) Applicants: Hyundai Motor Company, Seoul (KR); Kia Motors Corporation, Seoul (KR)

(72) Inventors: Hyung-Sik Choi, Seoul (KR); Gyung-Jae Heo, Gyeonggi-do (KR); Eui-Chan Cho, Gyeonggi-do (KR); Jea-Hong Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 808 days.

(21) Appl. No.: 16/598,738

(22) Filed: Oct. 10, 2019

(65) Prior Publication Data
US 2020/0130488 A1    Apr. 30, 2020

(30) Foreign Application Priority Data

Oct. 26, 2018  (KR) .......................... 10-2018-0129252

(51) Int. Cl.
  *B60J 10/76*  (2016.01)
  *B60J 1/17*  (2006.01)
  *B60J 10/00*  (2016.01)
  *B60J 10/36*  (2016.01)
  *B60J 5/04*  (2006.01)

(52) U.S. Cl.
  CPC .............. *B60J 10/76* (2016.02); *B60J 1/17* (2013.01); *B60J 5/0402* (2013.01); *B60J 10/36* (2016.02); *B60J 10/45* (2016.02)

(58) Field of Classification Search
  CPC ... B60J 1/17; B60J 5/0402; B60J 10/36; B60J 10/45; B60J 10/76; B60J 10/77; B60J 10/773; B60J 10/79
  USPC .............................. 296/146.2, 146.3, 146.16
  See application file for complete search history.

(56) References Cited

U.S. PATENT DOCUMENTS

| | | | |
|---|---|---|---|
| 4,457,111 A * | 7/1984 | Koike | B60J 10/86 296/146.3 |
| 4,653,230 A * | 3/1987 | Seo | B60J 10/79 49/374 |
| 4,731,951 A * | 3/1988 | Ikuta | B60J 10/79 49/374 |
| 10,167,659 B2 * | 1/2019 | Sagisaka | E05D 15/165 |

(Continued)

FOREIGN PATENT DOCUMENTS

| | | |
|---|---|---|
| JP | 2016-084065 A | 5/2016 |
| KR | 20070064476 A | 6/2007 |
| WO | 2018/114913 A1 | 6/2018 |

*Primary Examiner* — Jason S Daniels
(74) *Attorney, Agent, or Firm* — Fox Rothschild LLP

(57) ABSTRACT

A vehicle door glass assembly capable of regulating a position of a door glass may include a door frame forming a vehicle door; a garnish joined to a periphery of the door frame to finish an outer side face of the door frame; the door glass installed so as to be raised or lowered within the door frame; a glass run assembled to the door frame to support a periphery of the door glass; and a slider installed in an inner side face of the door glass to guide a raising or lowering movement of the door glass, where the garnish is provided with a restraint device configured to prevent the slider from moving in a longitudinal direction of a vehicle.

13 Claims, 15 Drawing Sheets

(56) References Cited

U.S. PATENT DOCUMENTS

| | | | | |
|---|---|---|---|---|
| 10,427,511 B2* | 10/2019 | Blottiau | .................. | B60J 10/74 |
| 10,442,281 B2* | 10/2019 | Krause | .................... | B60J 10/76 |
| 2017/0087969 A1* | 3/2017 | Dosaki | .................... | B60J 10/79 |
| 2017/0129318 A1* | 5/2017 | Uemura | .................. | B60J 10/79 |

* cited by examiner

VEHICLE DOOR GLASS ASSEMBLY AND METHOD FOR REGULATING POSITION OF DOOR GLASS

CROSS-REFERENCE TO RELATED APPLICATION(S)

This application claims under 35 U.S.C. § 119(a) the benefit of Korean Patent Application No. 10-2018-0129252, filed on Oct. 26, 2018, the entire contents of which are incorporated by reference herein by reference.

BACKGROUND

(a) Technical Field

The present disclosure relates to a vehicle door glass assembly installed in a door of a vehicle, more particularly, to the vehicle door glass assembly and method for regulating a position of a door glass, which are capable of improving an external appearance by merely installing the door glass in the door and regulating the position of the door glass.

(b) Description of the Related Art

A door of a vehicle is provided with a glass for lighting and ventilating the vehicle.

Referring to FIG. 1 (PRIOR ART), a door glass 120 is installed in such a manner that it can be raised or lowered within a door 110 wherein the door 110 is mounted with a glass run 121 for accommodating a periphery of the door glass 120 and guiding a raising or lowering movement of the door glass 120 when the door glass 120 is raised or lowered.

As described above, since the periphery of the door glass 120 is accommodated within the glass run 121, a stepped portion is inevitably generated between the door glass 120 and a garnish 113 attached to an outside of a door frame 111 (see FIG. 1).

FIG. 2 (PRIOR ART) shows an example in which a door glass 120 is installed according to an embodiment of the prior art.

A glass run 121 is inserted into a door frame 111 of a door 110 of a vehicle 100. The glass run 121 is mounted in such a manner that an end portion of the door glass 120 is arranged inside the glass run 121. A door trim 112 is mounted on the door frame 111 for interior finishing of the door frame 111. A weather strip 131 is installed inside the door frame 111 or in a center pillar 130 in order to prevent penetration of noise and foreign matter. A cross-sectional structure of the door 110 is formed as mentioned above.

A garnish 113 is additionally attached to the outside of the door frame 111, and as a result, a stepped portion S is formed between the door glass 120 and the garnish 113 by the glass run 121 and the garnish 113. The stepped portion S causes noise during high-speed driving because flow of air suddenly changes at the stepped portion and deteriorates aesthetic appearance of the vehicle.

In order to address this problem, frameless type doors 210F and 210R without a door frame have been proposed, as shown in FIG. 3 (PRIOR ART).

FIG. 4 (PRIOR ART) shows a cross section of the frameless type doors 210F and 210R. In this example, a door frame and a glass run are not adopted, a weather strip 231 is installed directly in a center pillar 230 and door glasses 220F and 220R are installed in a front door 210F and a rear door 210R respectively. In such a frameless type door, the front door glass 220F and the rear door glass 220R are formed at the same height, and a height of the garnish 213 is relatively low so that an external appearance is improved and a structure having a reduced stepped portion is formed. However, since end portions of the door glasses 220F and 220R are not restrained in a width direction of the vehicle 200 (i.e., an up-and-down direction in FIG. 4), there is a problem with respect to water tightness, and there is also a problem that noise penetrates into the vehicle interior during traveling. In FIG. 4, reference numeral 212 denotes a door trim.

In order to address this problem, a technique for installing a door glass 320 using a slider 322 is disclosed, as shown in FIG. 5 (PRIOR ART). The slider 322 is attached to the inner side face of the door glass 320 with an adhesive 323 while it is mounted such that an end portion of the slider 322 is inserted into the inside of a glass run 321 installed in a door frame 311. As described above, by attaching the slider 322 to the door glass 320 while mounting the slider 322 so as to be inserted into the glass run 321, the door glass 320 can be maintained at the same height as the garnish or the door frame 311 so that a stepped portion can be eliminated. However, as shown in FIG. 5, the slider 322 has a simple configuration, which causes the door glass 320 to play in a front-and-rear direction of the vehicle (i.e., a double-headed arrow direction in FIG. 5). Such a play may cause scattering in an assembling process or cause the door glass 320 to be broken away from its initial position as the door glass 320 is repeatedly raised and lowered in the vehicle.

FIG. 6 (PRIOR ART) discloses a technique for preventing a door glass 420 from playing in a front-and-rear direction of the vehicle by bending an end portion of a slider 422 such that the slider 422 is restrained to a glass run or a weather strip in a door frame 411. In this case, the end portion of the slider 422 is bent and the end portion of the slider 422 is restrained by a rib 421c formed on a glass run 421, so that the door glass 420 is prevented from playing.

However, since the end portion of the slider 422 is bent in the width direction of the vehicle, there is a problem in that ribs 421a, 421b and 421c formed on the glass run 421 make it difficult to insert the end portion of the slider 422 when inserting the slider 422 into the inside of the glass run 421. Since the ribs 421a, 421b and 421c are formed inside the glass run 421 so as to protrude from the inner side face of the glass run 421 for airtightness, the ribs 421a, 421b and 421c interfere with insertion of the slider 422. As a result, this was disadvantageous in assembling. Particularly, since the outside of the glass run 421 is supported by a garnish 413, a door frame 411, a door trim 412 and the like, the glass run 421 cannot be deformed to be widened when the slider 422 is inserted. As a result, assembling the slider 422 is inconvenient. As described above, since it is not easy to insert the slider 422 into the glass run 421, assembling speed is negatively impacted, and this causes a reduction in productivity.

SUMMARY

An object of the present disclosure is to provide a vehicle door glass assembly capable of regulating a position of a door glass whereby the door glass can be easily assembled to a glass run by eliminating a structure that interferes with insertion of a slider within the glass run and a method of assembling the same.

Another object of the present disclosure is to provide a vehicle door glass assembly capable of regulating a position of a door glass whereby no stepped portion is formed between the door glass and a garnish when the door glass is mounted in a glass run, and a method of regulating a position of the door glass.

Other objects and advantages of the present disclosure can be understood by the following description and become apparent with reference to the embodiments of the present disclosure. Also, it is obvious to those skilled in the art to which the present disclosure pertains that the objects and advantages of the present disclosure can be realized by the devices and methods as claimed and combinations thereof.

In accordance with one aspect of the present disclosure for accomplishing the objects as mentioned above, a vehicle door glass assembly capable of regulating a position of a door glass includes a door frame forming a vehicle door, a garnish joined to a periphery of the door frame to finish an outer side face of the door frame, the door glass installed so as to be raised or lowered within the door frame, a glass run assembled to the door frame to support a periphery of the door glass, and a slider inserted into the glass run and installed in an inner side face of the door glass to guide a raising or lowering movement of the door glass, where the garnish is provided with a restraint device configured to prevent the slider from moving in a longitudinal direction of a vehicle.

The restraint device can be a fixing protrusion protruding from a portion adjacent to the door glass in the garnish so as to direct toward an inside of the vehicle and restraining one side of the slider.

An end portion of the slider may be formed with a latching portion protruding from the slider so as to direct toward the outside of the vehicle and the fixing protrusion is configured to prevent the latching portion from being separated from the fixing protrusion.

The fixing protrusion may be formed in a partial section along a height direction of the vehicle.

The fixing protrusion may be formed within a predetermined length from a top end of the door glass.

The slider may be formed at an end portion of the door glass in a partial section along a height direction of the vehicle.

The slider may be formed within a predetermined length from the top end of the door.

The glass run may include a fastening part to be fastened to the door frame and a body part formed integrally with the fastening part wherein the fastening part is made of a material harder than a material of the body part.

An airtight part may extend from the fastening part along the outer side of the vehicle and contact the end portion of the door glass, and a fixing hole through which the fixing protrusion penetrates may be formed in the airtight part.

The body part may be formed in a "C" shape so as to accommodate the slider while allowing the slider to move.

One side of the fastening part may be provided with an airtight rib extended toward the slider and connected to the slider.

An end portion of the body part, which is joined to the door trim, may include an extension part extending from the body part to the inner side face of the door glass to support the inner side face of the door glass.

The extension part may support the door glass outside the portion where the slider is joined to the door glass.

The extension part may be formed in a convex shape toward the door glass.

The door glass and the garnish may be assembled without a stepped portion therebetween.

The slider may be installed inside the glass run along a raising and lowering direction of the door glass.

In accordance with another aspect of the present disclosure, there is provided a method of regulating a position of a door glass, including: assembling a glass run by inserting one side of the glass run into a door frame and fastening the glass run to the door frame, inserting a slider attached to an end portion of the door glass into the inside of the glass run, and assembling a garnish by inserting the garnish into the door frame.

According to the method, upon assembling the garnish, a fixing protrusion formed on the garnish may be inserted into a fixing hole formed in the glass run.

According to the method, upon assembling the garnish, the garnish may be assembled to the door glass without a stepped portion therebetween.

According to the inventive vehicle door glass assembly capable of regulating a position of a door glass and the inventive method thereof, which have features as described above, a position of the door glass can be maintained substantially constant without a separate operation for adjusting the position after the vehicle door glass assembly is arranged.

Moreover, there is no element interfering with insertion of the slider into the inside of the glass run when the slider attached to the door glass is inserted in order to assemble the door glass to the glass run, thereby facilitating assembling of the door glass.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Figure 1:
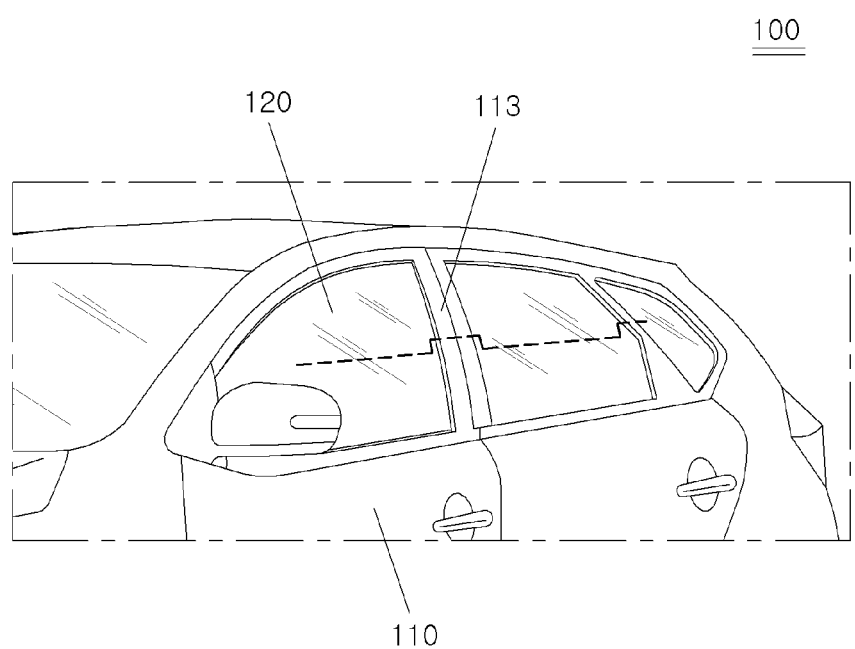
FIG. 1 (PRIOR ART) is a perspective view showing a state in which a vehicle door glass according to a first embodiment of the prior art is installed in a manner of forming a stepped portion between the door glass and a garnish.
Figure 2:
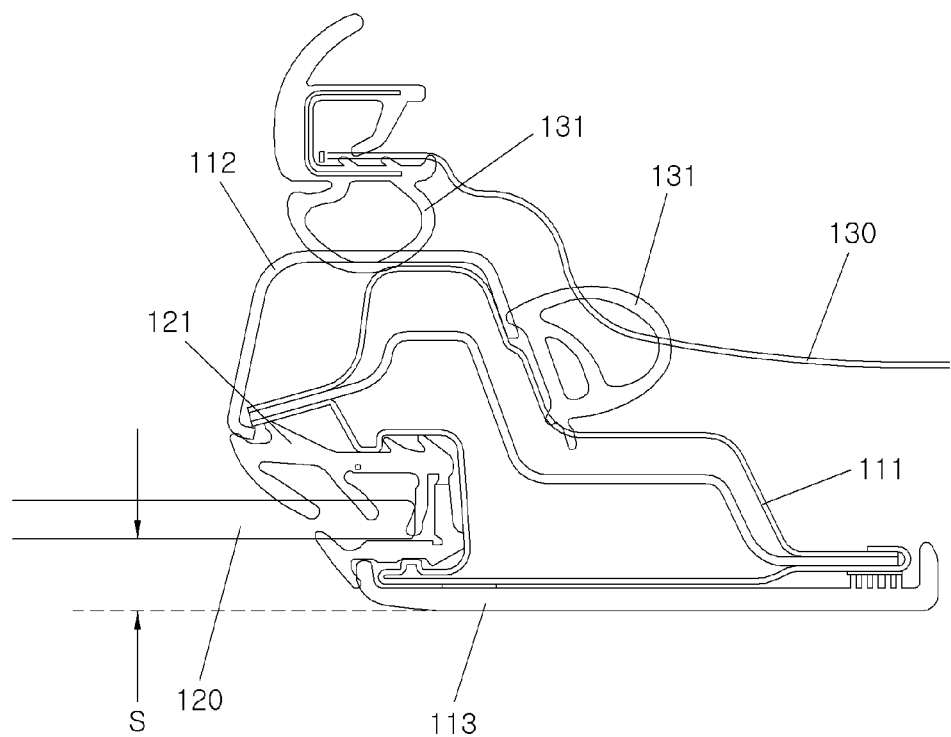
FIG. 2 (PRIOR ART) is a sectional view showing a state in which an end portion of the door glass in FIG. 1 is installed.
Figure 3:
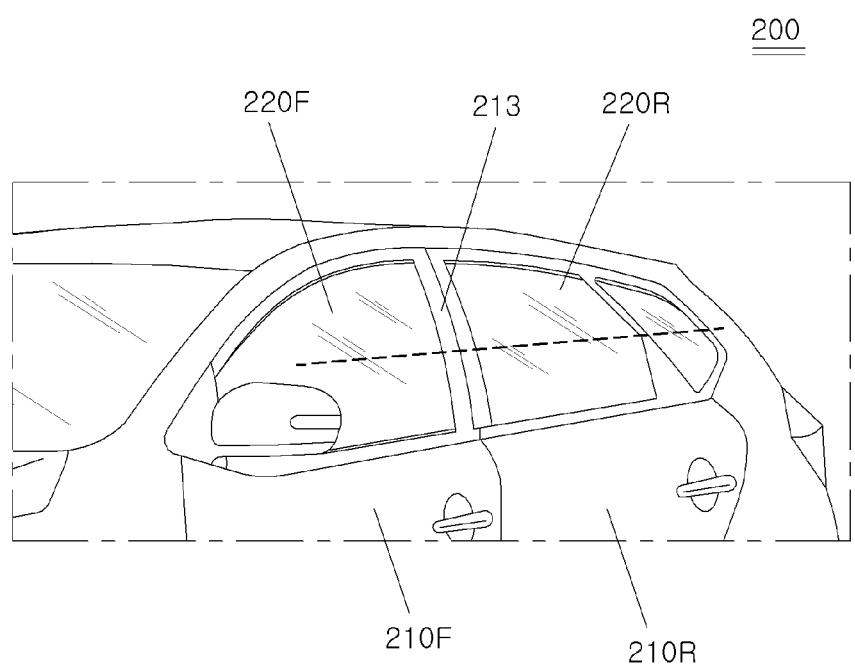
FIG. 3 (PRIOR ART) is a perspective view showing a state in which a vehicle door glass according to a second embodiment of the prior art is installed such that no stepped portion is formed between the door glass and a garnish.
Figure 4:
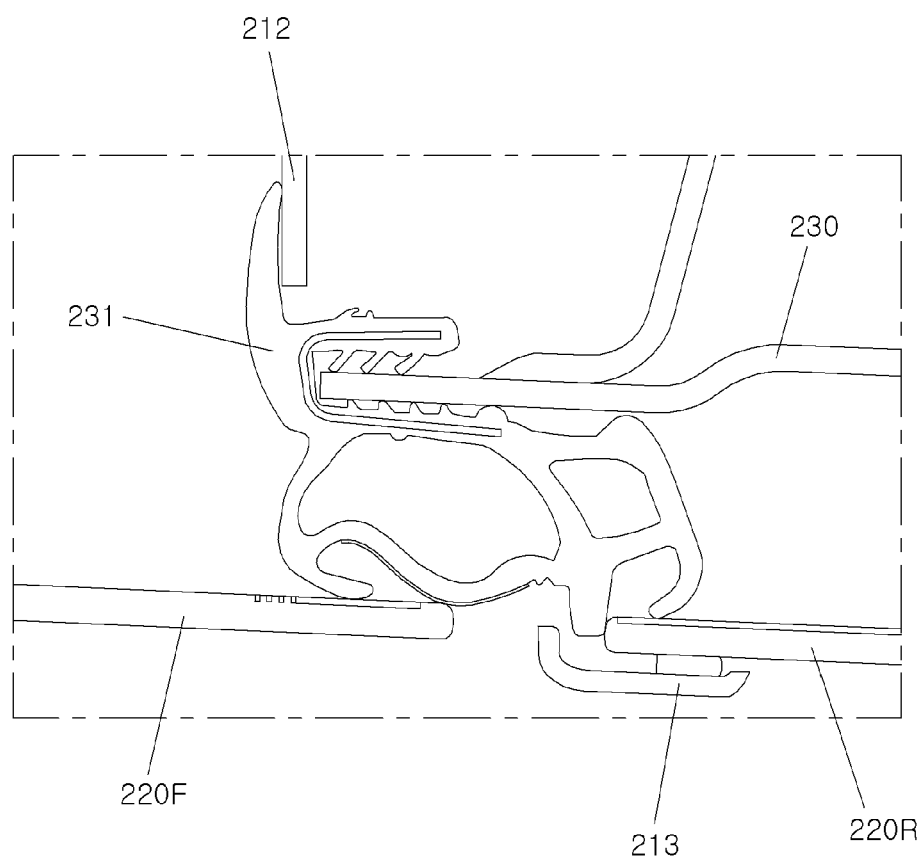
FIG. 4 (PRIOR ART) is a sectional view showing a state in which an end portion of the door glass in FIG. 3 is installed.
Figure 5:
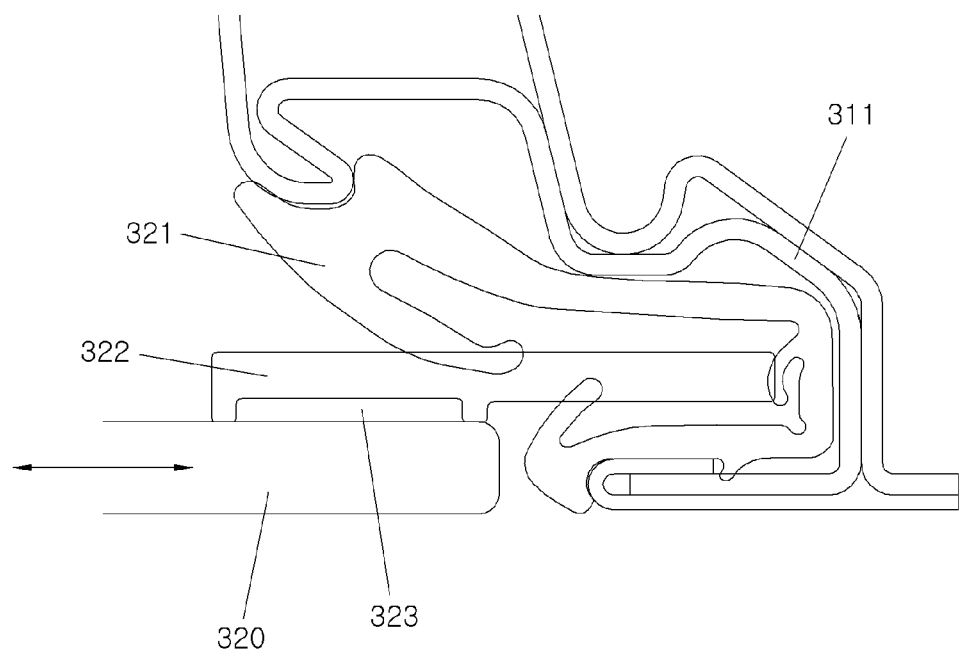
FIG. 5 (PRIOR ART) is a sectional view showing a state in which an end portion of a door glass is installed inside a glass run using a slider in case of a vehicle door glass according to a third embodiment of the prior art.
Figure 6:
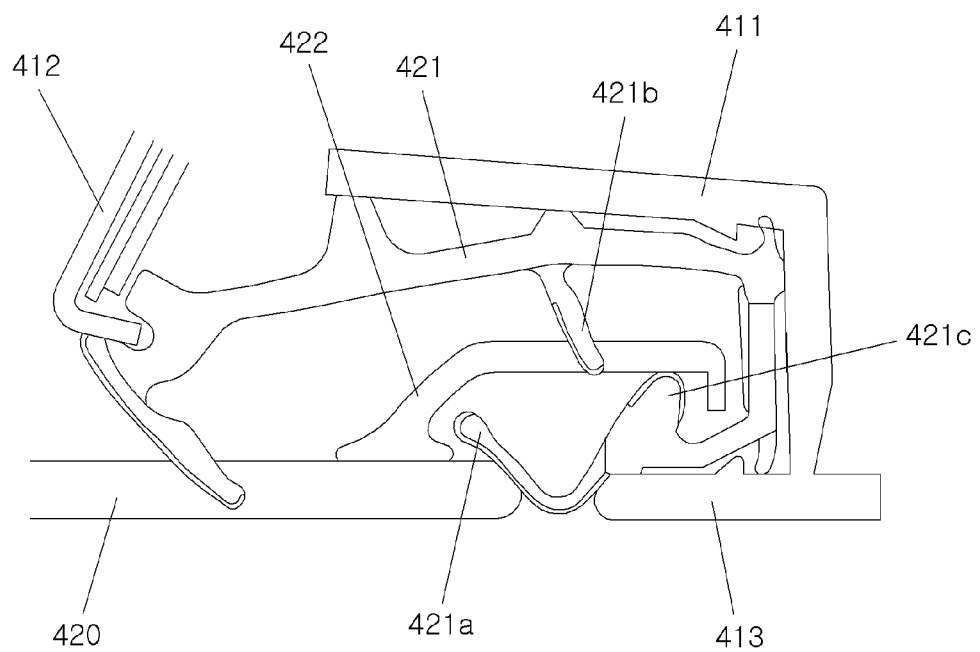
FIG. 6 (PRIOR ART) is a sectional view showing a state in which an end portion of a door glass is installed inside a glass run having a rib formed therein using a slider in case of a vehicle door glass according to a fourth embodiment of the prior art.
Figure 7:
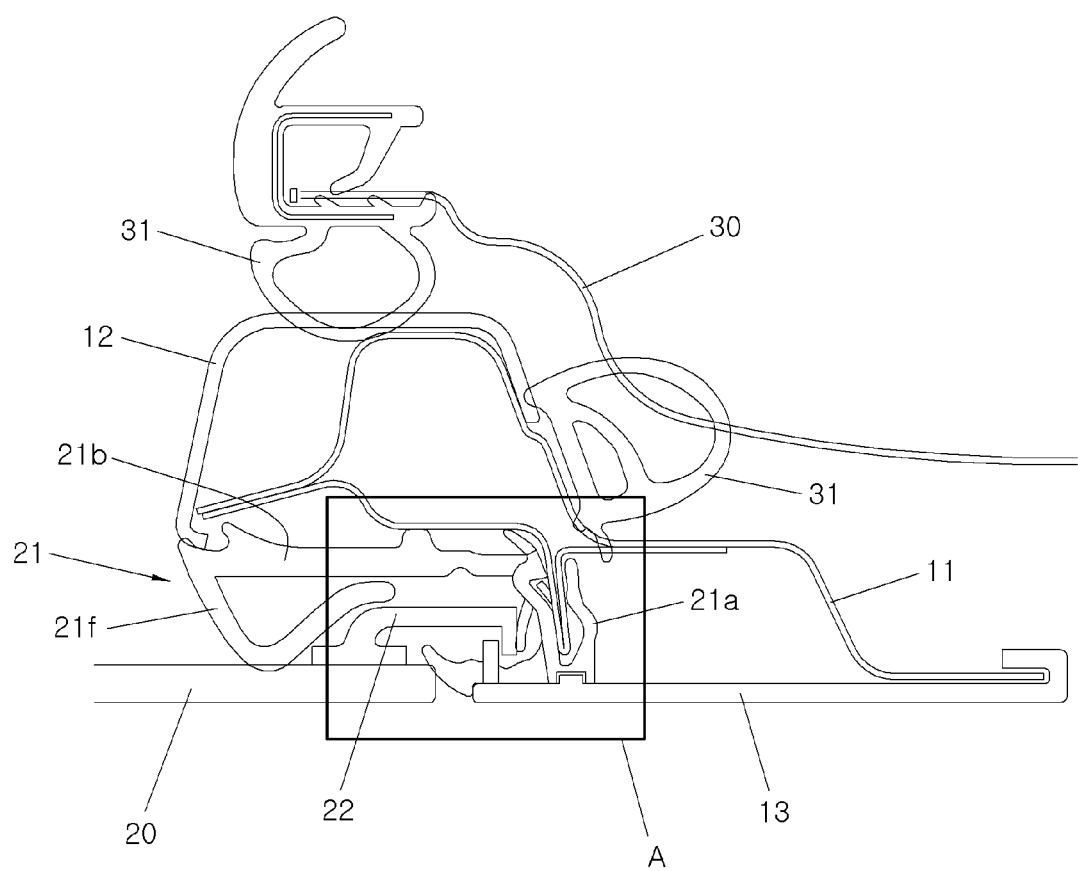
FIG. 7 is a sectional view showing a vehicle door glass assembly for regulating a position of a door glass according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In order to fully understand the present disclosure, operational advantages of the present disclosure and objects achieved by implementing the present disclosure, the accompanying drawings exemplifying preferred embodiments of the present disclosure and contents described in the accompanying drawings need to be referred to.

Hereinafter, a vehicle door glass assembly capable of regulating a position of a door glass, and a method of assembling the door glass according to an embodiment of the present disclosure will be described in detail with reference to the accompanying drawings.

A vehicle door glass assembly capable of regulating a position of a door glass according to an embodiment of the present disclosure includes a door frame 11 forming a vehicle door 10, a garnish 13 joined to a periphery of the door frame 11 to finish an outer side face of the door frame 11, a door glass 20 installed so as to be raised or lowered within the door frame 11, a glass run 21 assembled to the door frame 11 to support a periphery of the door glass 20, and a slider 22 inserted into the glass run 21 and installed in an inner side face of the door glass 20 to guide a raising or lowering movement of the door glass 20, where the garnish 13 is provided with a restraint device for preventing the slider 22 from moving in a longitudinal direction of a vehicle.

The door frame 11 maintains rigidity of the vehicle door 10 and defines an outer shape of the vehicle door 10. An upper portion of the door frame 11 to be opened and closed by the door glass 20 is formed along a portion in contact with a vehicle body of the vehicle.

The door glass 20 is installed in the door frame 11 so as to be raised or lowered. The door glass 20 is assembled to the glass run 21 by use of the slider 22 in such a manner that it is positioned at the same height as the garnish 13. In other words, an end portion of the door glass 20 is provided with a slider 22 which is attached to the inner side face of the door glass 20 and extends in the longitudinal direction of the vehicle. The slider 22 is formed so as to extend from the inner side face of the end portion of the door glass 20 toward a position where the door frame 11 is located. The slider 22 is positioned inside a space formed by the door frame 11 so that the door glass 20 can be raised or lowered by use of the slider 22 instead of the glass run 21.

In case where the end portion of the door glass 20 is directly received in the door frame 11, the door frame 11 surrounds the end portion of the door glass 20. As a result, there is inevitably generated a stepped portion between the door glass 20 and the garnish 13 joined to the door frame 11 or the top side of the door frame 11. In this embodiment, however, since the slider 22 is applied, the door glass 20 can be maintained at the same height as the door frame 11 or the garnish 13 so that no stepped portion is generated at the end portion of the door glass 20. In other words, since no stepped portion is generated between the door glass 20 and the garnish 13, the door glass 20 and the garnish 13 are located together on the same plane at least in the portion where they are adjacent to each other while they are located on the same straight line in a cross-sectional view.

The garnish 13 is joined to the periphery of the door frame 11 to finish the outer face of the door frame 11. The garnish 13 is formed of a synthetic resin material or the like and fastened to the door frame 11. The garnish 13 is fastened to the door frame 11 so as to be located outside the door glass 20. The garnish 13 is finally maintained at the same height as the door glass 20. Since the garnish 13 is maintained at the same height as the door glass 20, no stepped portion exists between the door glass 20 and the garnish 13 after assembling.

The glass run 21 is assembled to the door frame 11 to support the periphery of the door glass 20. The door frame 11 is formed with a space for accommodating the end portion of the slider 22 and the glass run 21 is assembled inside the space.

The glass run 21 preferably is formed of a synthetic resin material in such a manner that a portion of the glass run 21 that is mounted to the door frame 11 and another portion of the glass run 21 that supports the door glass 20 have different hardness.

Figure 8:
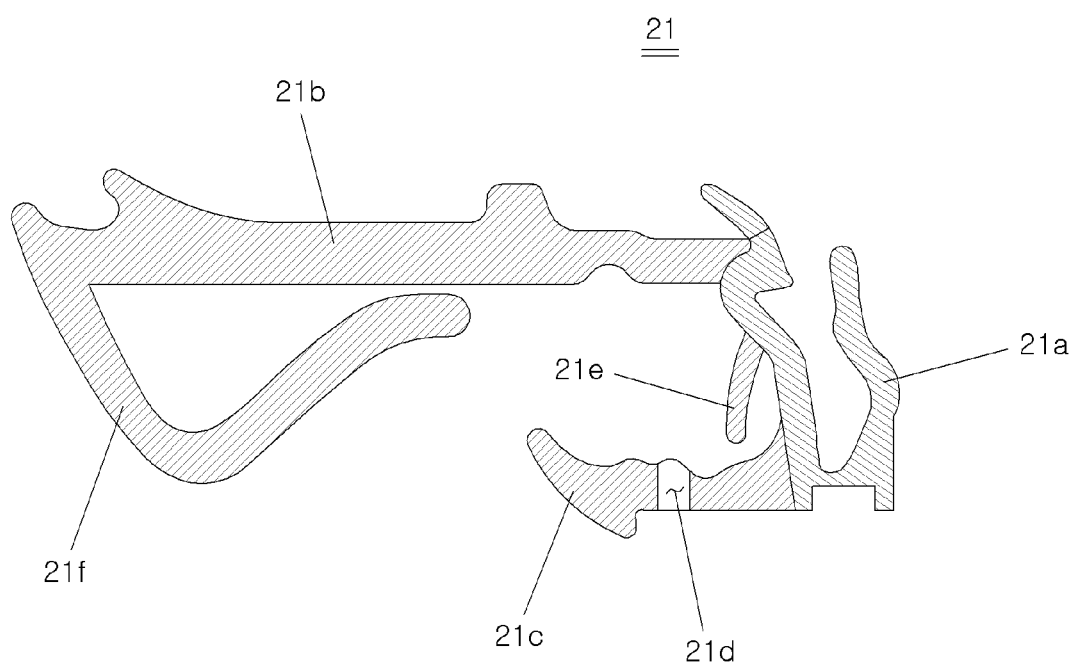
FIG. 8 is a sectional view showing a glass run in case of a vehicle door glass assembly capable of regulating a position of a door glass according to an embodiment of the present disclosure.

In other words, the glass run 21 as shown in FIG. 8 is configured such that a fastening part 21a fastened to the door frame 11 is made of a hard material.

The glass run 21 comprises a body part 21b which is supported inside the door frame 11 to support the end portion of the slider 22. The body part 21b is made of a soft material as compared with the fastening part 21a. The body part 21b is formed with an airtight part 21c extending from the body part 21b so as to direct toward the inside of the body part 21b, an airtight rib 21e and an extension part 21f. The body part 21b, the airtight part 21c, the airtight rib 21e and the extension part 21f are preferably made of the same material.

The airtight part 21c extending from the fastening part 21a, the airtight ribs 21e, and the extension part 21f extending from the body part 21b support the end of the slider 22, guide a raising or lowering movement of the door glass 20 when the door glass 20 is raised or lowered, and prevent foreign matter and noise from penetrating into the vehicle interior.

The airtight part 21c is extended from the fastening part 21a along the outside of the vehicle and contacts the end portion of the door glass 20, thereby supporting the end portion of the door glass 20 and at the same time sealing the end portion of the door glass 20. The airtight part 21c is formed with a fixing hole 21d in the width direction of the vehicle. The fixing hole 21d allows a fixing protrusion 13a which will be described later to be inserted therein such that the garnish 13 is fastened thereto.

The airtight rib 21e is extended from one side of the fastening part 21a toward the slider 22 and contacts the end of the slider 22 to seal the end of the slider 22.

The extension part 21f is extended from the inner side end portion of the body part 21b toward the inner side face of the door glass 20. The extension part 21f is formed in such a manner that it is convex toward the inner side face of the door glass 20 and a maximally convex portion thereof contacts the inner side face of the door glass 20 to support the inner side face of the door glass 20.

Since the airtight part 21c, the airtight rib 21e and the extension part 21f are made of a soft material such as synthetic rubber, they can be deformed so as to facilitate insertion of the slider 22 when the slider 22 is inserted into the inside of the glass run 21 in order to assemble the door glass 20. Particularly, the extension part 21f is deformed to remain connected to (i.e., cling) to the body part 21b when the slider 22 is inserted, and then clings to the inner side face of the door glass 20 after insertion of the slider 22 is completed.

The garnish 13 and the glass run 21 are provided with a restraint device for preventing the door glass 20 from moving in the longitudinal direction of the vehicle, respectively.

The restraint device is configured to prevent the door glass 20 from moving in a front-and-rear direction of the vehicle when the door glass 20 is raised or lowered so that a gap between the door glass 20 and the garnish 13 is maintained constant in spite of repeated raising and lowering operations.

The restraint device may be the fixing protrusion 13a protruding from the garnish 13 so as to direct toward the inside of the vehicle to restrain one side of the slider 22. The fixing protrusion 13a protrudes from the inner side face of the garnish 13 toward the inside of the vehicle and this fixing protrusion 13a restrains one side of the slider 22.

The slider 22 is formed with a latching portion 22a which is restrained by the fixing protrusion 13a. The latching portion 22a is formed so as to protrude from the end portion of the slider 22 in an outward direction of the vehicle. The latching portion 22a cooperates with the fixing protrusion 13a to prevent the slider 22 from being broken away from the garnish 13 in the longitudinal direction of the vehicle when the door glass 20 is raised or lowered. In this way, the slider 22 is prevented from being broken away in the longitudinal direction of the vehicle so that the door glass 20 incorporated with the slider 22 can also be prevented from being broken away in the longitudinal direction of the vehicle.

Figure 9:
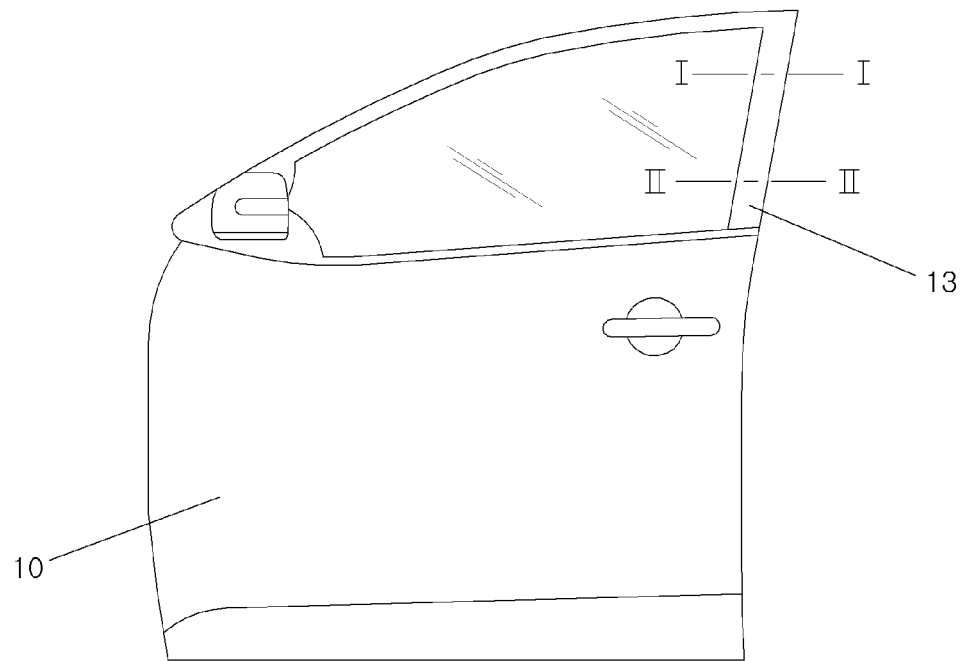
FIG. 9 is a side view of a door, in which section lines are indicated in order to explain how a glass run and a garnish are fastened along a height direction of a vehicle in case of a vehicle door glass assembly capable of facilitating regulation of position according to an embodiment of the present disclosure.
Figure 10:
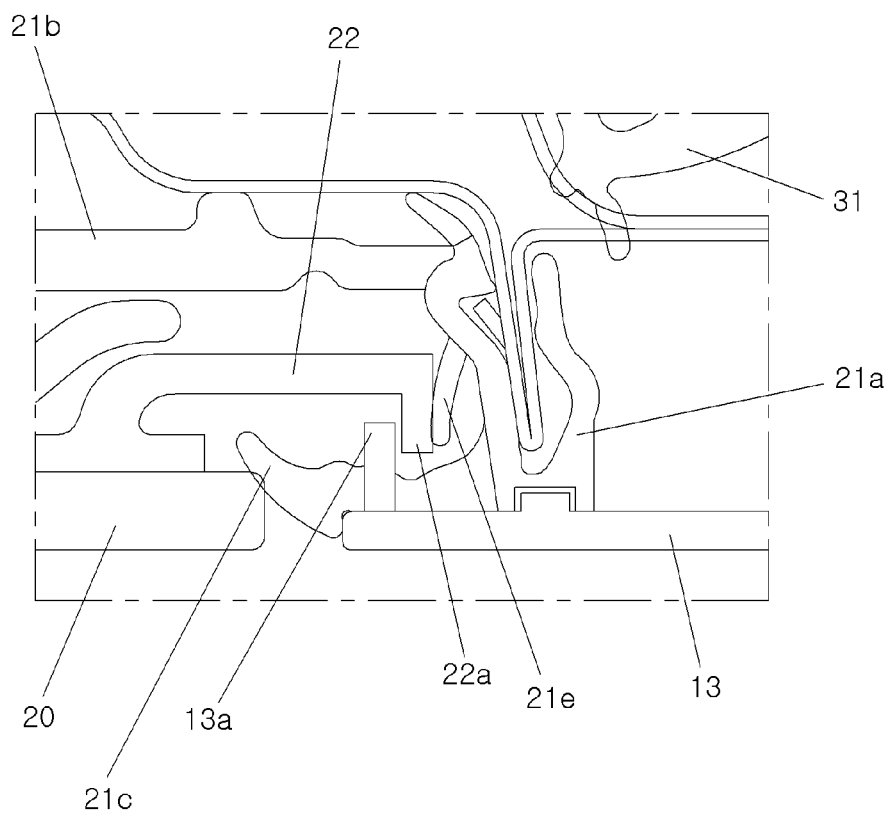
FIG. 10 is a cross-sectional view taken along a line I-I in FIG. 9.
Figure 11:
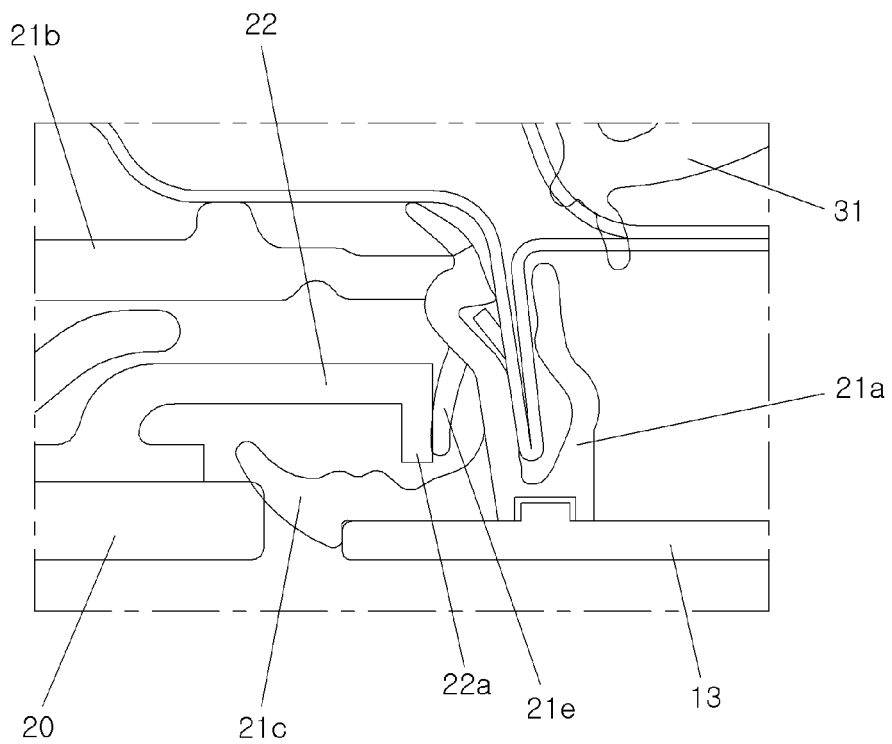
FIG. 11 is a cross-sectional view taken along a line II-II in FIG. 9.

The restraint device, i.e., the fixing protrusion 13a is preferably formed in a partial section along a height direction of the vehicle. In other words, as shown in FIG. 9, the fixing protrusion is formed within a predetermined length from a top end of the door 10. If the door glass 20 is prevented from moving in the longitudinal direction of the vehicle when the door glass 20 is raised or lowered, particularly when the door glass 20 is raised up to the maximum, then an error due to breakaway of the door glass 20 is eliminated so that position of the door glass 20 can be maintained at a predetermined position even next time to open or close the door glass.

On the other hand, the fixing protrusion 13a may not be formed in the remaining section, for example, the section indicated by a line II-II in FIG. 9.

Further, the slider 22 may also be formed only in a partial section of the door glass 20.

However, since the slider 22 must be supported by the glass run 21 when the door glass 20 is raised or lowered, the slider is preferably formed throughout the entire section of the door glass 20. Even if the slider 22 is formed throughout the entire section of the door glass 20, it is preferable that the door glass 20 is restrained by the fixing protrusion 13a only in the partial section, that is, only when the door glass is raised up to the maximum.

A weather strip 31 for securing airtightness is installed in at least either one of the door frame 11 and a center pillar 30.

FIGS. 12A-12C and 13 illustrate a method of assembling a vehicle door glass assembly capable of regulating a position of a door glass according to an embodiment of the present disclosure.

Figure 12A:
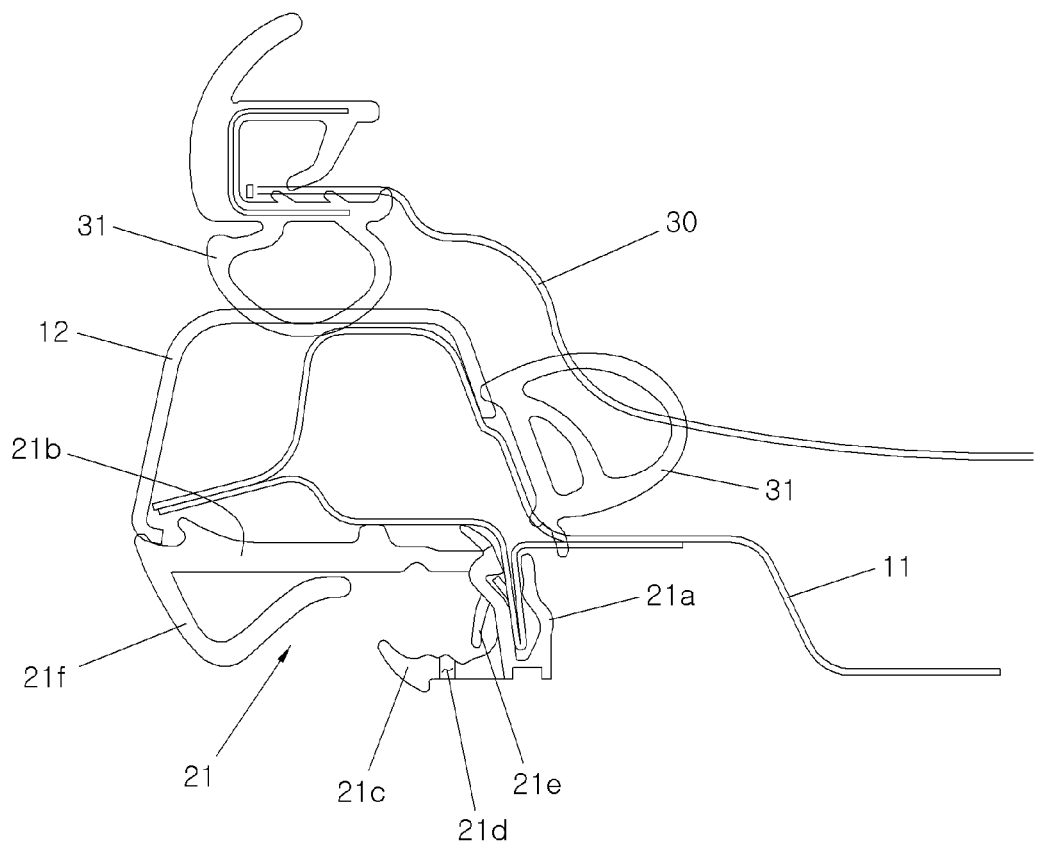
FIGS. 12A to 12C are cross-sectional views sequentially showing processes of assembling a vehicle door glass assembly capable of facilitating regulation of position according to an embodiment of the present disclosure.

In a step S110 of assembling the glass run, the glass run 21 is inserted into a space formed in the door frame 11 such that the glass run 21 is mounted to the door frame 11 (see FIG. 12A).

One side of the glass run 21, i.e., the fastening part 21a of the glass run 21 is fitted into the door frame 11 so that the glass run 21 is assembled to the door frame 11 to allow the door glass 20 to be mounted thereto.

When the glass run 21 is fitted into the door frame 11, the fastening part 21a of the glass run 21 grips one side of the door frame 11 so that the glass run 21 is fixed to the door frame 11.

Further, some points on the outer side face of the glass run 21 are supported by the door frame 11 and the door trim 12 and in turn assembling the glass run 21 is completed.

Figure 12B:
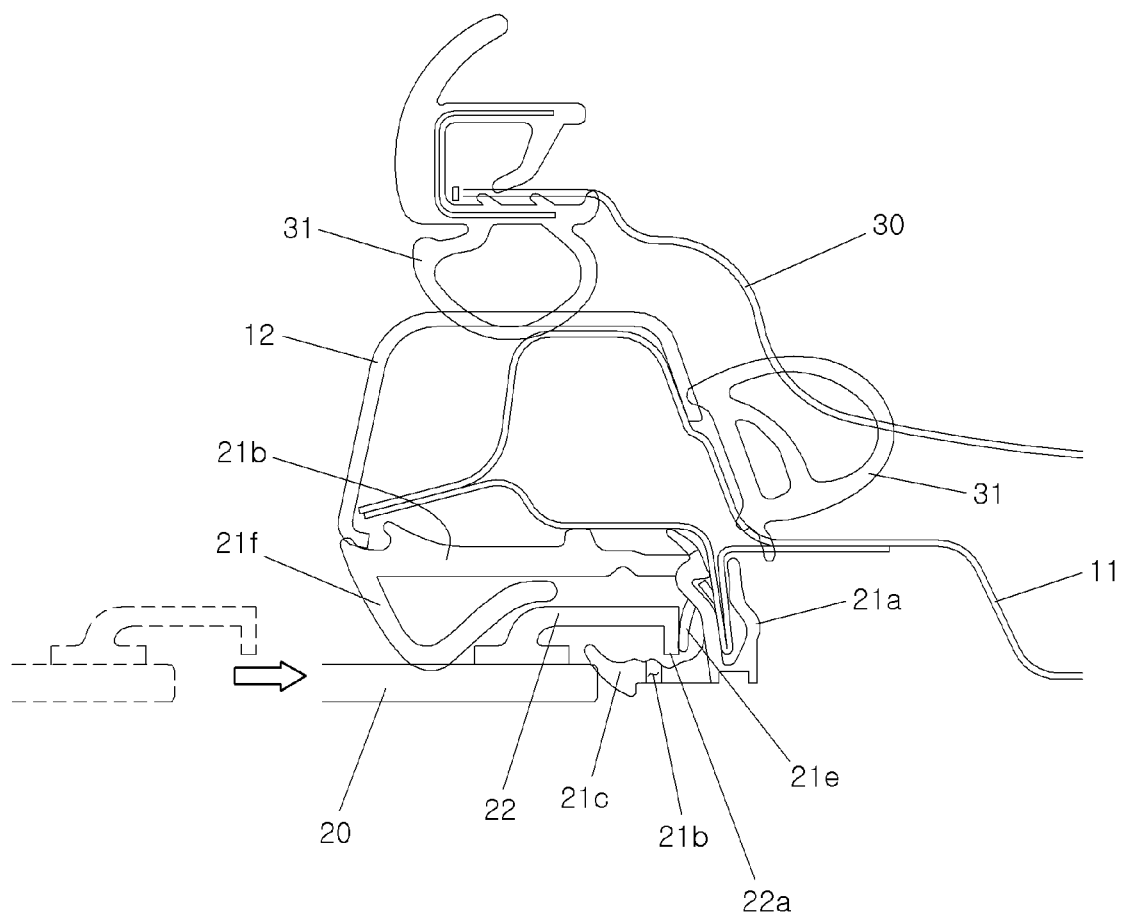

In a step S120 of inserting the slider, the slider 22 attached to the end portion of the door glass 20 is inserted into the inside of the glass run 21. As shown in FIG. 12B, the slider 22 is inserted into the inside of the glass run 21 in the longitudinal direction of the vehicle in a state where the slider 22 is attached to the door glass 20 such that the slider 22 is positioned inside the glass run 21. When the slider 22 is assembled, the fastening part 21a of the slider 22 is in contact with the airtight rib 21e while the end portion of the door glass 20 is in contact with the airtight part 21c and the inner side face of the door glass 20 is in contact with the extension part 21f, so that the end of the door glass 20 and the slider 22 are contacted with each other and supported by the glass run 21.

Figure 12C:
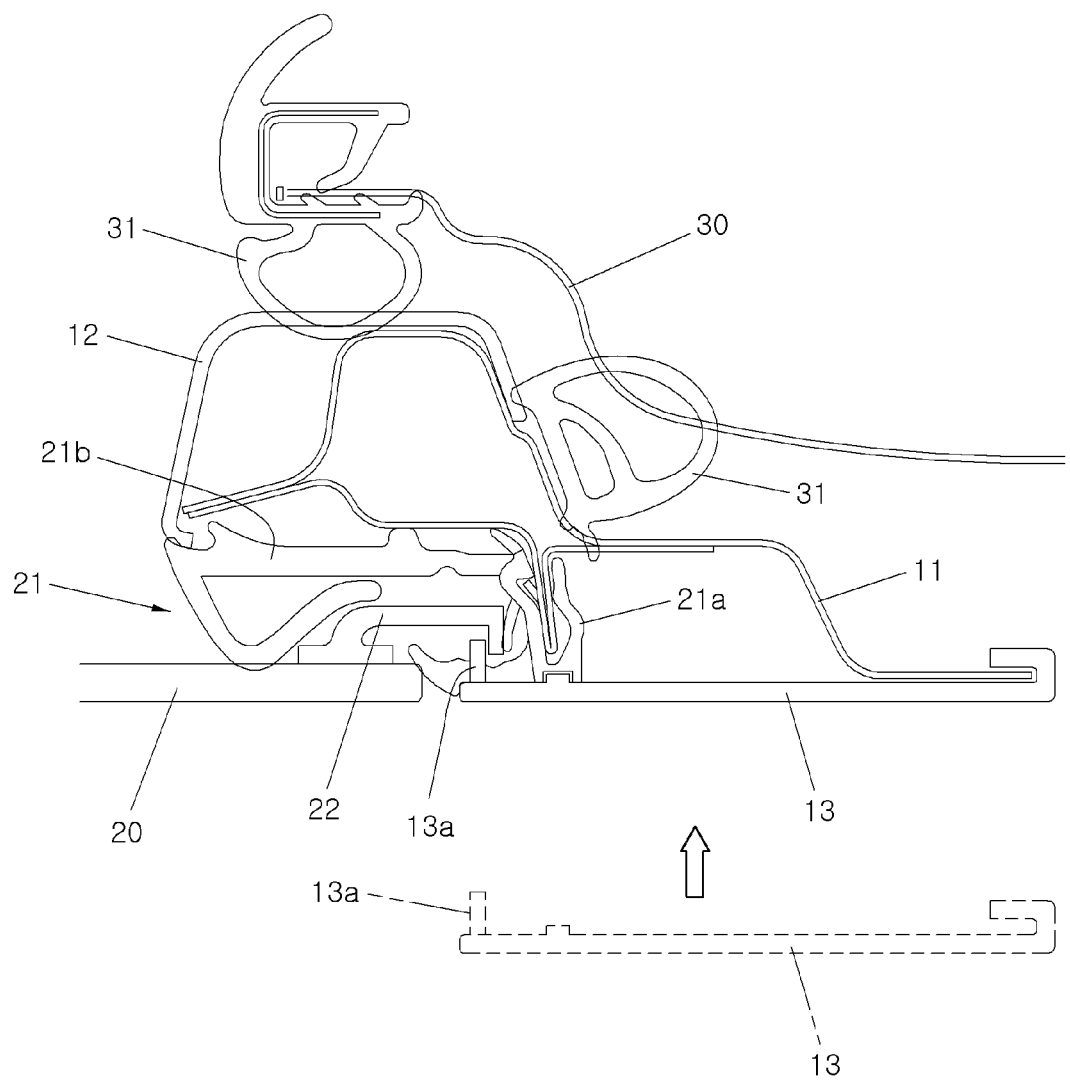
Figure 13:
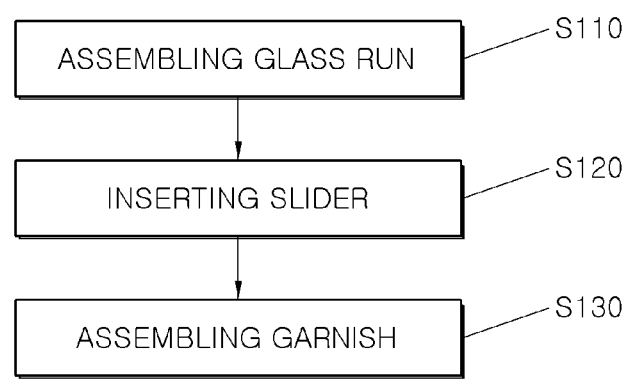
FIG. 13 is a flow chart showing a method of assembling a vehicle door glass assembly capable of facilitating regulation of position according to an embodiment of the present disclosure.

In a step S130 of assembling the garnish, the garnish 13 is inserted into the door frame 11 (see FIG. 12C). One side of the garnish 13 is formed with a structure that can fix the garnish to the door frame 11 so that the garnish 13 is inserted into the door frame 11 using the structure. For example, as shown in FIG. 12C, a rear end of the garnish 13 is formed in a hook shape such that the door frame 11 can be surrounded and fixed by the hook shaped rear end, thereby enabling the garnish 13 to be inserted into the door frame. Particularly, in this embodiment of the present disclosure, the fixing protrusion 13a for preventing breakaway of the slider 22 in the longitudinal direction of the vehicle is formed at the front end of the garnish 13 in the longitudinal direction. Accordingly, in the step S130 of assembling the garnish, the fixing protrusion 13a is inserted into the fixing hole 21d of the glass run 21 to assemble the garnish 13.

Moreover, the door glass 20 is positioned on the same plane as the garnish 13 so that no stepped portion is generated between the door glass and the garnish.

Although the present disclosure has been described in the foregoing with reference to the drawings illustrated by way of example, the present disclosure is not limited to the disclosed embodiments, and it will be apparent to those of ordinary skill in the art that various modifications and variations can be made to the present disclosure without departing from the spirit and scope of the disclosure. Therefore, such modifications or variations fall within the scope of the present disclosure as claimed and the scope of the present disclosure should be interpreted based on the appended claims.

What is claimed is:

1. A vehicle door glass assembly capable of regulating a position of a door glass, comprising:
a door frame forming a vehicle door;
a garnish joined to a periphery of the door frame to finish an outer side face of the door frame;
the door glass installed so as to be raised or lowered within the door frame;
a glass run assembled to the door frame to support a periphery of the door glass; and
a slider installed in an inner side face of the door glass to guide a raising or lowering movement of the door glass,
wherein the garnish is provided with a restraint device configured to prevent the slider from moving in a longitudinal direction of a vehicle,
wherein the restraint device is a fixing protrusion protruding from a position adjacent to the door glass in the garnish so as to direct toward an inside of the vehicle and restraining one side of the slider;
wherein the glass run comprises a fastening part to be fastened to the door frame and a body part formed integrally with the fastening part, and wherein the fastening part is made of a material harder than a material of the body part; and
wherein an airtight part extends from the fastening part along the outer side of the vehicle and contacts the end portion of the door glass, and a fixing hole through which the fixing protrusion penetrates is formed in the airtight part.

2. The vehicle door glass assembly according to claim 1, wherein an end portion of the slider is formed with a latching portion protruding from the slider so as to direct toward an outside of the vehicle, and the fixing protrusion is configured to prevent the latching portion from being separated from the fixing protrusion.

3. The vehicle door glass assembly according to claim 1, wherein the fixing protrusion is formed in a partial section along a height direction of the vehicle.

4. The vehicle door glass assembly according to claim 3, wherein the fixing protrusion is formed within a predetermined length from a top end of the vehicle door.

5. The vehicle door glass assembly according to claim 3, wherein the slider is formed at an end portion of the door glass in a partial section along the height direction of the vehicle.

6. The vehicle door glass assembly according to claim 5, wherein the slider is formed within a predetermined length from a top end of the door glass.

7. The vehicle door glass assembly according to claim 1, wherein the body part is formed in a "C" shape so as to accommodate the slider while allowing the slider to move.

8. The vehicle door glass assembly according to claim 1, wherein one side of the fastening part is provided with an airtight rib extended toward the slider and connected to the slider.

9. The vehicle door glass assembly according to claim 1, wherein an end portion of the body part, which is joined to the door trim, comprises an extension part extending from the body part to the inner side face of the door glass to support the inner side face of the door glass.

10. The vehicle door glass assembly according to claim 9, wherein the extension part supports the door glass outside the portion where the slider is joined to the door glass.

11. The vehicle door glass assembly according to claim 10, wherein the extension part is formed in a convex shape toward the door glass.

12. The vehicle door glass assembly according to claim 1, wherein the door glass and the garnish are assembled without a stepped portion therebetween.

13. The vehicle door glass assembly according to claim 1, wherein the slider is installed inside the glass run along a raising and lowering direction of the door glass.

* * * * *